UNITED STATES PATENT OFFICE.

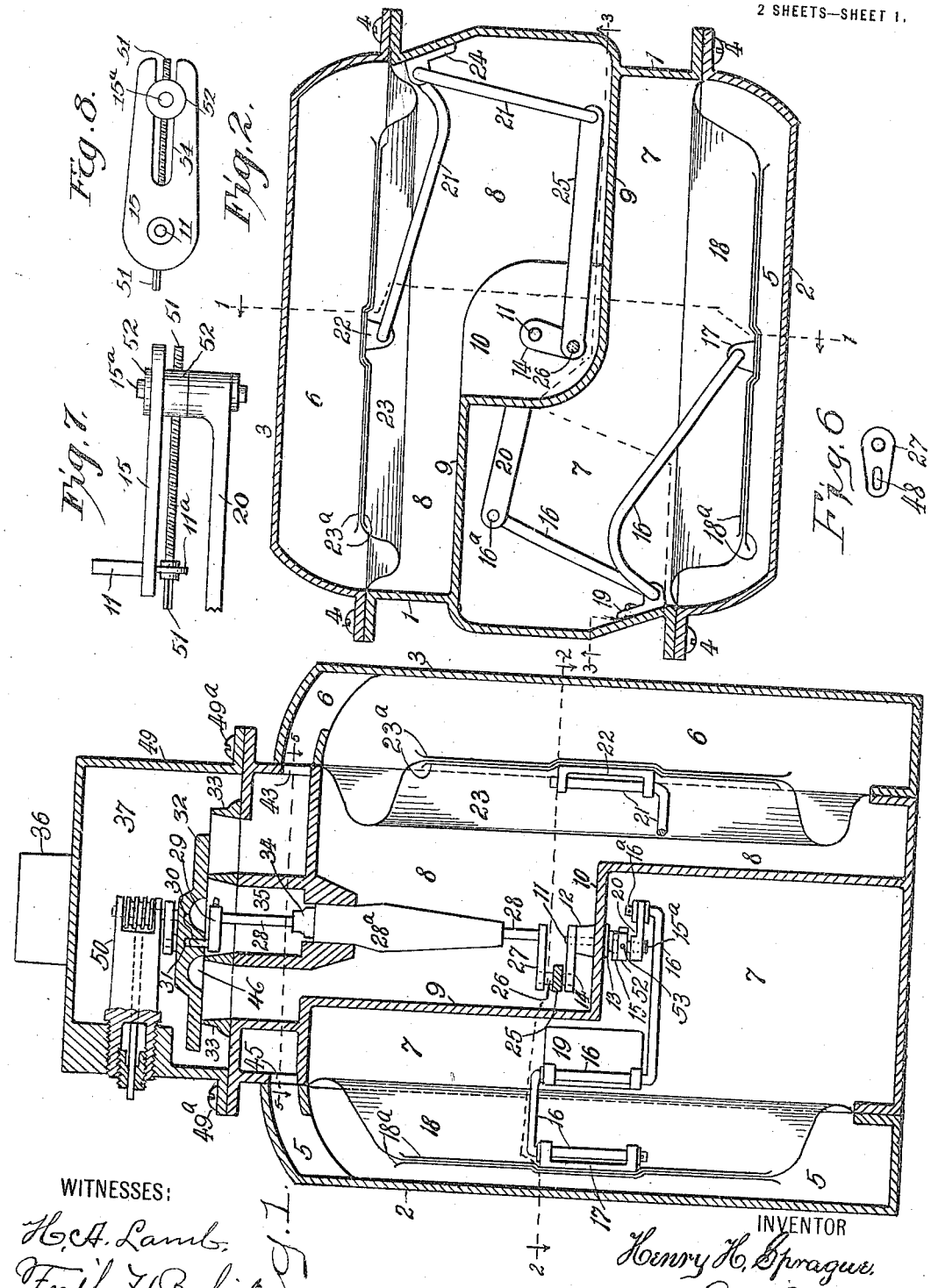
H. H. SPRAGUE.
GAS METER.
APPLICATION FILED MAY 11, 1915.
1,238,453.
Patented Aug. 28, 1917.
2 SHEETS—SHEET 1.
WITNESSES:
H. A. Lamb
Fredk. N. Beckwith
INVENTOR
Henry H. Sprague,
BY Geo. D. Phillips
his ATTORNEY

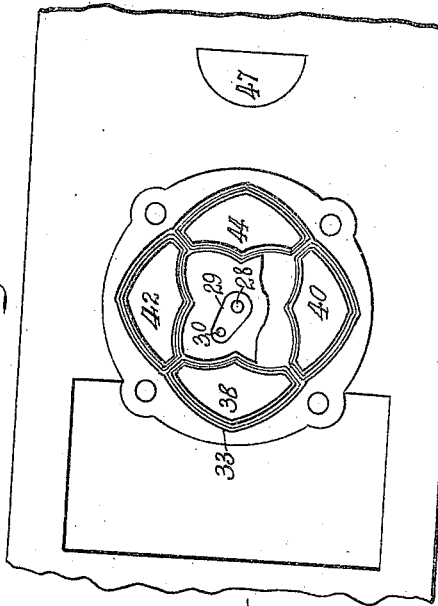
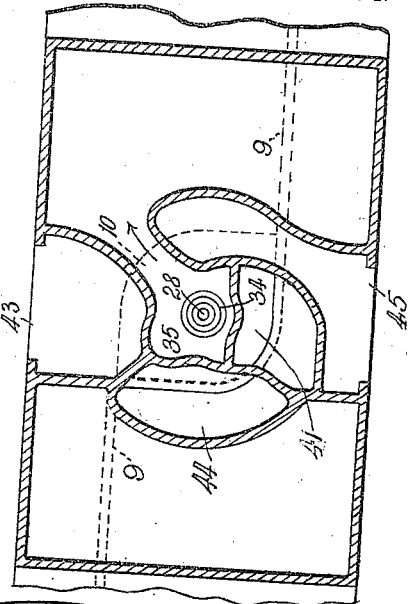
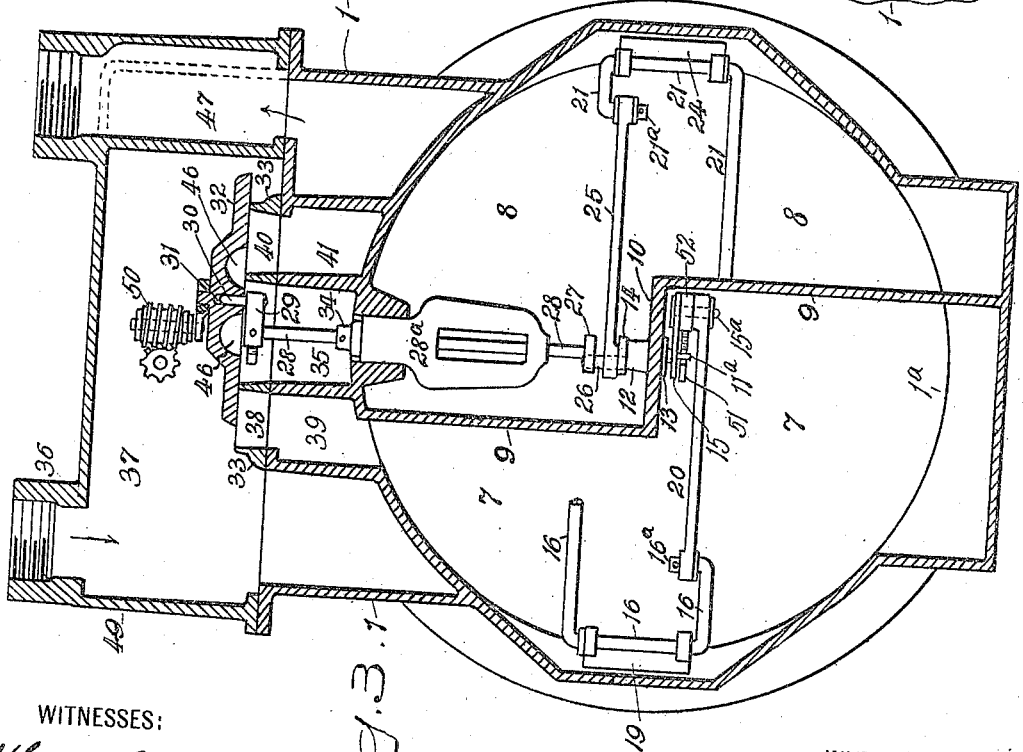

HENRY H. SPRAGUE, OF BRIDGEPORT, CONNECTICUT.

GAS-METER.

1,238,453.  Specification of Letters Patent.  Patented Aug. 28, 1917.

Application filed May 11, 1915.  Serial No. 27,293.

*To all whom it may concern:*

Be it known that I, HENRY H. SPRAGUE, citizen of the United States, residing at Bridgeport, in the county of Fairfield and State of Connecticut, have invented certain new and useful Improvements in Gas-Meters; and I do hereby declare the following to be a full, clear, and exact description of the invention, such as will enable others skilled in the art to which it appertains, to make and use the same.

My invention relates to an improvement in gas meters, and particularly to that class in which diaphragms are used to form chambers, the vibrations of which are adapted to operate the valves, opening and closing the inlet and outlet ports leading to the different chambers.

The object of my invention is to construct a meter having a cast-iron case and possessing great capacity in proportion to its size and weight, combined also with simplicity and cheapness of construction and repairs.

To this end my invention consists—

First, in constructing the meter of four distinct and removable parts—viz., the central body portion with a central partition, the side covers therefor, and the cap—thereby forming when the diaphragms are in place, five distinct compartments—viz., an upper gas-distributing chamber and four measuring chambers.

Second, alternately actuating the valve crank shaft by the diaphragms on each side of the partition through the medium of a lever and a link located in each of the two central measuring chambers and a short shaft journaled in the partition and carrying crank arms operatively connected to each diaphragm and to the valve actuating crank shaft.

While meters have heretofore been constructed with four measuring chambers and two movable diaphragms, in every case they have conveyed the power, generated by the pressure of the gas on the diaphragms, up to the valve operating crank shaft either by means of reciprocating shafts passing from a measuring chamber through stuffing-boxes into the distributing chamber, or by means of the double crank shaft journaled in the partition and with a crank arm on each side of the partition connected directly by links to the diaphragms. By connecting the diaphragms to the valve-operating crank shaft through the medium of a lever and a link located in the measuring chamber instead of a single link, I am able to convey the power to the valve-operating crank shaft through the rotating centrally located partition shaft. This construction permits a longer travel of the diaphragms, transmits more power to the valve driving crank shaft, eliminates the reciprocating shafts employed in the ordinary tin meter, and reduces the size of the enveloping case to a minimum.

In order to obtain the fullest advantage of a cast-iron case, it is important that this case should be as small as possible, both for convenience in handling and its production at a minimum cost. The object of my invention is to produce a perfectly functioning mechanism requiring a minimum enveloping case with four chambers being no larger than the three chambered case as set forth in the patent granted me March 10, 1903, No. 722,390. The advantage of a four chambered meter over one having three chambers is that there is a greater displacement per revolution in the former, thus making slower speed resulting in less absorption of power and less wear. This is accomplished principally by my diaphragm operated lever and link located in a measuring chamber. The type of meters using the diaphragm operated reciprocating shafts necessarily requires either a larger case or a sacrifice of diaphragm power. The same thing is true of the type of meters in which the diaphragm is connected directly to the valve actuating crank shaft by means of a single link. In both cases the power generating capacity of the diaphragm is directly proportional to its length of travel and with a given travel or a given power they both require a larger case than is required in my arrangement of parts.

The adjustment of the meter can be made by the usual sliding of an adjustment pin by means of a screw, on one or both the cranks in the central measuring chambers.

Referring to the drawings,—

Figure 1 represents a vertical central sectional view of the body, partition and distributing chamber;

Fig. 2 is a sectional view on line 2—2 of Fig. 1;

Fig. 3 is a sectional view on line 3—3 of Fig. 2;

Fig. 4 is an upper plan view of the distributing chamber showing the valve seat, valve crank, and broken view of the body;

Fig. 5 is a sectional view on line 5—5 of Fig. 1, and broken view of the body; and Fig. 6 is a detail view of one of the crank arms.

Fig. 7 is a side elevation of the meter adjustment mechanism, and broken view of a link connected therewith; and Fig. 8 is an upper plan view of the meter adjustment mechanism.

The body 1 is provided with the oppositely located recessed side covers 2 and 3 secured to the body by screws 4. These covers form the side measuring chambers 5 and 6, while the bore 1ª of the main body of the meter is divided into two equal measuring chambers 7 and 8 by the partition 9 integral with the body. This partition has the intermediate offset 10 through which the short crank shaft 11 extends. This shaft is provided with the gas check or blind valves 12 to prevent gas escaping from one central chamber to the other. 13 is a collar on said shaft opposite said valve. This shaft carries at its ends the crank arms 14 and 15, one in each central chamber.

The diaphragm lever 16 is journaled in the bracket 17 secured to the diaphragm 18 in the central chamber 7, and also in the bracket 19 secured to the inner wall of the body. The link 20 pivotally connects the pin 15ª of the crank arm 15 with the inner upturned end 16ª of this diaphragm lever.

In like manner—in the central chamber 8—the diaphragm lever 21 is journaled in the bracket 22 secured to the diaphragm 23 and also in the bracket 24 secured to the inner wall of the body. The link 25 pivotally connects the crank pin 26 with the inner downwardly projecting end 21ª of the diaphragm lever 21. This crank pin 26 connects the crank arm 14 with the crank arm 27 secured to the lower end of the valve actuating crank shaft 28 journaled in the vertically projecting bracket 28ª secured to the body. The upper end of this arm carries the crank arm 29 whose crank pin 30 enters the hole 31 formed in the bottom of the horizontally operating valve 32 to impart an eccentric movement to said valve on its detachable seat 33. 34 is a gas check or blind valve to shut off the gas between the exhaust port 35 and the central measuring chamber 8.

Gas is admitted through the inlet 36 to the distributing chamber as is usual in meters of this character, and from this distributing chamber the gas passes through the different ports to the several measuring chambers as follows: Through valve seat port 38 and port 39 to the central chamber 7. Valve seat port 40 communicates with port 41 and the other central chamber 8. Valve port 42 communicates with port 43 and the side chamber 6, and valve seat port 44 communicates with port 45 and the other side measuring chamber 5. The exhaust is through the recess 46 in the underside of the valve and the exhaust port 35 to the outlet 47.

To obviate the necessity of perfect alinement between the short double crank shaft 11 and the valve actuating crank shaft 28, the slot 48—Fig. 6—is formed in the crank arm 27.

The diaphragms 18 and 23 are held between the covers 2 and 3 and the body of the meter, and the central parts of these diaphragms are reinforced by the metal disks 18ª and 23ª.

The distributing cover 49 is removably connected to the meter body by screws 49ª, and it carries the usual index driving mechanism 50, which being old and well known, a detail description of the same is unnecessary.

The adjustment of the meter can be effected by any desired mechanism. In the drawings I have shown adjusting means connected with the crank arm 15 located in the central chamber 7, as follows: The lower end 11ª of the double crank shaft 11 is flattened, and such flattened end projects through said crank arm, and a hole—not shown—is provided in this flattened end to receive the adjusting screw 51. 52 is a movable block on the underside of the crank arm through which the crank pin 15ª passes. This block is provided with the threaded hole 53 to receive the end of the screw 51, which screw also passes through the crank pin. The slot 54—Fig. 8—is provided in the crank arm to permit the crank pin being shifted by the screw to change the throw of the crank arm.

Having thus described my invention, what I claim is:—

1. A gas meter comprising a body having a bore therethrough, recessed covers closing the bore, a partition dividing the bore into two compartments, a flexible diaphragm in each compartment to form a side measuring chamber and a central measuring chamber on each side of the partition, a valve actuating crank shaft located in one of the central chambers and carrying a crank arm at its lower end, a double crank shaft journaled in the partition with one crank arm in each central measuring chamber, one of said crank arms operatively connected with the valve actuating crank shaft, a link pivoted to each arm of the double crank shaft, a lever pivotally supported to the case in each central chamber and pivotally connecting the diaphragms with the links.

2. A gas-meter body having a central partition and diaphragms to form two central and two outer measuring chambers, a centrally located valve-actuating crank-shaft, double arm levers each pivotally supported by the body and located entirely in a single central chamber, the diaphragms each being pivoted to one arm of a lever, and a link pivotally connecting the other arm of said lever with the crank shaft.

In testimony whereof I affix my signature in presence of two witnesses.

HENRY H. SPRAGUE.

Witnesses:
KINGSLEY B. HILL,
GEORGE W. VIEBROCK.